United States Patent [19]
Parrinello et al.

[11] Patent Number: 5,691,389
[45] Date of Patent: Nov. 25, 1997

[54] RECYCLING OF FLEXIBLE FOAM

[75] Inventors: Giovanni Parrinello, Fort Collins, Colo.; David Thorpe; Gabriel Verhelst, both of Herent, Belgium; Julian Francis George Hopper, Maassluis, Netherlands; Mireille Berthine Albert De Witte, Merelbeke, Belgium

[73] Assignee: Imperial Chemical Industries PLC, London, England

[21] Appl. No.: 757,778

[22] Filed: Nov. 27, 1996

Related U.S. Application Data

[62] Division of Ser. No. 206,562, Mar. 3, 1994, Pat. No. 5,605,935.

[30] Foreign Application Priority Data

Oct. 11, 1993 [GB] United Kingdom .................. 9320874

[51] Int. Cl.$^6$ ..................................... C08J 11/04
[52] U.S. Cl. .................. 521/49.5; 521/49; 521/155; 521/159; 521/170; 521/174; 521/912; 528/59; 528/85
[58] Field of Search ............ 521/49.5, 49, 155, 521/159, 170, 174, 912; 528/59, 85

[56] References Cited

U.S. PATENT DOCUMENTS

| | | | |
|---|---|---|---|
| 2,937,151 | 5/1960 | Broeck et al. | 260/2.3 |
| 3,300,417 | 1/1967 | McElroy | 260/2.3 |
| 3,404,103 | 10/1968 | Matsudaira et al. | 260/2.3 |
| 3,632,530 | 1/1972 | Kinoshita et al. | 260/2.3 |
| 3,708,440 | 1/1973 | Frulla et al. | 260/2.4 |
| 4,110,266 | 8/1978 | Sherette | 260/2.3 |
| 4,159,972 | 7/1979 | Braslow et al. | 260/2.3 |
| 4,316,992 | 2/1982 | Gerlock et al. | 568/621 |
| 4,317,939 | 3/1982 | Gerlock et al. | 568/121 |

FOREIGN PATENT DOCUMENTS

| | | |
|---|---|---|
| 2084922 | 6/1993 | Canada . |
| 1501550 | 2/1978 | European Pat. Off. . |
| 0010850 | 5/1980 | European Pat. Off. . |
| 0022617 | 1/1981 | European Pat. Off. . |
| 0296449 | 12/1988 | European Pat. Off. . |
| 0309217 | 3/1989 | European Pat. Off. . |
| 0309218 | 3/1989 | European Pat. Off. . |
| 0392788 | 10/1990 | European Pat. Off. . |
| 0442631 | 8/1991 | European Pat. Off. . |
| 0443614 | 8/1991 | European Pat. Off. . |
| 0480588 | 4/1992 | European Pat. Off. . |

OTHER PUBLICATIONS

Hooper et al. "Recent Developments in the Chemical Recycling of flexible polyurethanes", Cellular Polymers, vol. 11, No. 5, 1992, pp. 388–396.

*Primary Examiner*—Nathan M. Nutter
*Assistant Examiner*—Duc Truong

[57] ABSTRACT

Process for recycling flexible foams by glycolysis and extraction. The glycolysis is conducted by allowing the foam to react with low molecular weight polyols, then allowing the mixture to separate in two phases.

10 Claims, No Drawings

RECYCLING OF FLEXIBLE FOAM

CROSS REFERENCE TO RELATED APPLICATIONS

The present application is a divisional of U.S. patent application Ser. No. 08/206,562, filed Mar. 3, 1994, now U.S. Pat. No. 5,605,935.

The present invention is concerned with the recycling of flexible polyurethane foams, with the products obtained by this recycling process, with prepolymers made from products obtained by this recycling process and with processes for preparing useful polyurethane products from said prepolymers and said products obtained by this recycling process.

The re-use of plastics and polyurethane foams in particular has been described extensively in the past and consists mainly of energy recovery, physical recycling and chemical depolymerisation.

Chemical depolymerisation of polyurethanes may be achieved, amongst other processes, by hydrolysis, aminolysis, glycolysis and hydroglycolysis. Such processes have been described widely in the art, see e.g. U.S. Pat. Nos. 3,632,530, 3,708,440, 4,159,972, 3,404,103, 3,300,417, 2,937,151, 4,316,992 and European Patent Application 546415.

In the context of the present invention the following terms have the following meaning:

1) isocyanate index or NCO index or index: the ratio of the number of NCO-groups over the number of isocyanate-reactive hydrogen atoms present in a formulation, given as a percentage:

$$\frac{[NCO] \times 100 \, (\%)}{[\text{active hydrogen}]}.$$

In other words the NCO-index expresses the percentage of isocyante actually added to a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water, if used) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "(average nominal) hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

6) The term "high molecular weight polyol" refers to polyols preferably polyether polyols, most preferably polyoxyethylene polyols, polyoxypropylene polyols and polyoxyethylene polyoxypropylene polyols, which polyols have an average nominal hydroxyl functionality of 2–6 and a number average equivalent weight of 500–5000.

7) The term "alcoholising polyol" refers to those polyols which are able to alcoholise flexible polyurethane foams and which are immiscible with the high molecular weight polyol obtained in the alcoholysis process; wherein immiscible means that at most 30%, preferably at most 20% by weight of alcoholising polyol can be dissolved in the high molecular weight polyol at room temperature. Surprisingly we have found that flexible polyurethane foams may be alcoholised in such a way that two products are obtained, the first product (hereinafter called product 1) being a high molecular weight polyol which after purification has properties equivalent to the originally used high molecular weight polyol and which can be used again completely to make a recycled flexible foam having properties similar to the original flexible foam and the second product (hereafter called product 2) being a product comprising urethane groups which product after purification and/or further chemical treatment may be used in different useful ways.

Consequently the present invention is concerned with a process for alcoholizing a flexible polyurethane foam by bringing the foam in contact with an alcoholizing polyol, preferably selected from glycerol and an oxyethylene polyol having a molecular weight of 62–500 and mixtures thereof, allowing the foam and the polyol to react, then allowing the mixture to separate in an upper and a lower phase and subsequently collecting these two phases in separate containers. The upper phase contains predominantly a polyol having a high molecular weight (product 1) and the lower phase contains predominantly alcoholizing polyol and products having a low molecular weight comprising urethane, amine and hydroxyl groups (product 2).

The flexible polyurethane foam starting material is a foam made by reacting a polyisocyanate and a polyol having a high molecular weight using a blowing agent and optionally a chain extender or cross-linker and additives conventionally used in preparing flexible polyurethane foams. Such foams, ingredients used for preparing the foams and processes for preparing such foams have been described extensively in the art, see e.g. European Patent Publications 10850, 22617, 296449, 309217, 309218, 392788, 442631 and 480588. Organic polyisocyanates used for making such flexible foams may be selected from aliphatic, cycloaliphatic and araliphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p- tetramethylxylylene diisocyanate, and in particular aromatic polyisocyanates like tolylene diisocyanates (TDI), phenylene diisocyanates and most preferably methylene diphenyl isocyanates having an isocyanate functionality of at least two. The methylene diphenyl isocyantes (MDI) may be selected from pure 4,4'-MDI, isomeric mixtures of 4,4'-MDI and 2,4'-MDI and less than 10% by weight of 2,2'-MDI, crude and polymeric MDI having isocyanate functionalities above 2, and modified variants thereof containing carbodiimide, uretonimine, isocyanurate, urethane, allophanate, urea or biuret groups, Most preferred methylene diphenyl isocyanates re pure 4,4'-MDI, isomeric mixtures with 2,4'-MDI optionally containing up to 50% by weight of polymeric MDI and uretonimine and/or carbodiimide modified MDI having an NCO content of at least 25% by weight and urethane modified MDI obtained by reacting excess MDI and a low molecular weight polyol (MW less than 999) and having an NCO content of at least 25% by weight. Mixtures of methylene diphenyl isocyanates with up to 25% by weight of other polyisocyanates mentioned above may be used if desired.

The polyisocyanate may contain dispersed urea particles and/or urethane particles prepare din a conventional way, e.g. by adding a minor amount of an isophorone diamine to the polyisocyanate. The high molecular weight polyols used for preparing such flexible foams may be selected from polyesters, polyesteramides, polythioethers, polycarbonates, polyacetals, polyolefins, polysiloxanes and, especially, polyethers. Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used. Especially useful polyether polyols include polyoxypropylene diols and triols and poly(oxyethyleneoxypropylene) diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of up to 25% and random/block copolymers having oxyethylene contents of up to 50%, based on the total weight of oxyalkylene units may be mentioned, in particular those having at least part of the oxyethylene groups at the end of the polymer chain. Mixtures of the said diols and triols can be particularly useful. Other particularly useful polyether polyols include polytetramethylene glycols obtained by the polymerisation of tetrahydrofuran. Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerisation of lactones, for example caprolactone, in conjunction with a polyol, or of hydroxy carboxylic acids such as hydroxy caproic acid, may also be used. Polyesteramides may be obtained by the inclusion of aminoalcohols such as ethanolamine in polyesterification mixtures. Polythioether polyols which may be used include products obtained by condensing thiodiglycol either alone or with other glycols, alkylene oxides, dicarboxylic acids, formaldehyde, amino-alcohols, or aminocarboxylic acids Polycarbonate polyols which may be used include products obtained by reacting diols such as 1,3-propanediol, 1,4-butanediol, 1,6-hexanediol, diethylene glycol or tetraethylene glycol with diaryl carbonates, for examples diphenyl carbonate, or with phosgene. Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols and triols. Other polyols which may be used comprise dispersions or solutions of addition or condensation polymers in polyols of the types described above. Such modified polyols, often referred to as "polymer" polyols have been fully described in the prior art and include products obtained by the in situ polymerisation of one or more vinyl monomers, for example styrene and/or acrylonitrile, in polymeric polyols, for example polyether polyols, or by the in situ reaction between a polyisocyanate and an amino- and/or hydroxy-functional compound, such as triethanolamine, in a polymeric polyol. Polyoxyalkylene polyols containing from 5 to 50% of dispersed polymer are particularly useful. Particle sizes of the dispersed polymer of less than 50 microns are preferred. The number average equivalent weight of the high molecular weight polyols preferably is 750–3000; the average nominal hydroxyl functionality preferably is 2–4; the hydroxyl value preferably ranges from 15–200 and most preferably from 20–100. The chain-extending and cross-linking agents which optionally may be used in preparing such foams may be selected from amines and polyols containing 2–8 and preferably 2–4 amine and/or hydroxy groups link ethanolamine, diethanolamine, triethanolamine, ethylene glycol, diethylene glycol, triethylene glycol, propylene glycol, dipropylene glycol, butanediol, glycerol, trimethylolpropane, pentaerithrithol, sorbitol, sucrose, polyethylene glycol having an equivalent weight of less than 500, toluene diamine, diethyl toluene diamine, cyclohexane diamine, phenyl diamine, diphenylmethane diamine, and alkylated diphenylmethane diamine and ethylene diamine. The amount of chain-extending and cross-linking agents is, if applied, up to 25 and preferably up to 10 parts by weight per 100 parts by weight of the high molecular weight polyol. The blowing agent may be selected from physical blowing agents like chlorofluorocarbons, hydrogen chlorofluorocarbons, hydrogen fluorocarbons and preferably from chemical blowing agents, especially those which lead to $CO_2$ liberation when reacted with the polyisocyanate under foam forming conditions. Most preferably water is used as the sole blowing agent. The amount of water may range from 2–20 preferably from 3–15 parts by weight per 100 parts by weight of isocyanate-reactive compound having a number average equivalent weight of 500 to 5000. The auxiliaries and additives which amongst others may be used are formation of urea and urethane enhancing catalysts like tertiary amines, imidazoles and tin compounds, surfactants, stabilisers, flame retardants, fillers and anti-oxidants. They may be premixed with the isocyanate-reactive materials before these materials are reacted with the polyisocyanate in order to prepare the foams. The foams may be made according to the one-shot process, the semi- or quasi prepolymer process or the prepolymer process. The foams may be slab-stock or moulded flexible foams. The foams in general have a density of 15–80 kg/m$^3$ and may have been used as cushioning material in furniture, car-seats and mattresse for instance.

Although in principle any such flexible polyurethane foam may be used in the process according to the present invention, MDI-based, polyether polyol-based, fully water blown flexible polyurethane foams are particularly preferred in view of the very good results obtained, as will be described hereinafter. Amongst these particularly preferred foams, those prepared according to the prepolymer process as described in EP 392788 are even further preferred.

The flexible foam may be combined with the alcoholizing polyol in the form in which it is received but preferably the size of the foam pieces is reduced, if necessary, in a way suitable for reducing the size and/or for increasing the density of foam pieces, like by cutting, milling, pelletizing, grinding, comminution, densification and pressing and combinations thereof. Although the success of the process of the present invention does not greatly depend on the size of the foam pieces it is for efficiency and handling reasons preferred to have pieces having an average diameter between 0.1 mm and 10 cm.

The alcoholizing polyol preferably is selected from glycerol and an oxyethylene polyol having a molecular weight of 62–500 which may have a hydroxyl functionality of 2–8, and may be selected from ethylene glycol and polyols prepared by reacting ethylene oxide with an initiator having a hydroxyl functionality of 2–8 like ethylene glycol, glycerol, trimethylol propane, pentaerythritol and sorbitol. Preferably the hydroxyl functionality is 2. Most preferably the alcoholizing polyol is ethylene glycol or diethylene glycol or a mixture thereof.

The foam or foam pieces and the alcoholizing polyol are combined, suitably by normal mixing in a container suitable to conduct a alcoholysis reaction process. The alcoholysis reaction conditions are chosen in such a way that the alcoholysis reaction reaches equilibrium in a reasonable period of time. Generally the pressure applied ranges from ambient pressure to 10 bar, preferably from ambient pressure to 5 bar and most preferably the process is conducted at ambient pressure, and the reaction temperature ranges from 170° to 240° C., preferably from 180° to 220° C. and the reaction time from 0.5 to 8 hours, preferably from 1 to 6 hours. The reaction preferably is conducted while stirring and under a N$_2$ blanket. The relative amounts of the foam and the polyol generally will range from 0.1 to 10 parts by weight (pbw) of polyol per pbw of foam and preferably from 0.5 to 5 pbw. If desired water may be present in an amount of up to 5% by weight on foam and polyol. If desired other reactive ingredients like alkanol amines may be present in an amount of up to 5% by weight on foam and polyol. If desired other reactive ingredients like alkanol amines may be present in an amount of up to 5% by weight on foam and polyol. If desired a catalyst enhancing the alcoholysis of the foam may be used like tetrabutyltitanate, potassium acetate, dimethylimidazole and in general urethane-reaction promoting catalysts.

After the mixing is stopped, the mixture is left for a period sufficient to allow the mixture to separate in two phases. Generally a period ranging from 1 minute to 24 hours will be sufficient. Preferably this period is 15 minutes to 4 hours.

After stirring has been discontinued the temperature may be maintained while the phases are allowed to separate and when the phases are collected. Alternatively the temperature may be reduced by cooling or by no longer supplying heat after stirring has been discontinued or after phase separation but before collecting the phases.

The upper phase predominantly comprises the high molecular weight polyol from which the foam was made (product 1) and the lower phase predominantly comprises the other chemicals obtained (product 2) together with the alcoholizing polyol.

The both products are then collected separately in a conventional way, e.g. by decanting the upper phase or by removing the lower phase via an outlet in the bottom of the container. Sometimes an interface may be present after phase separation between the upper and the lower phase, which interface may be collected separately or together with either of the two phases.

The process may be conducted batchwise or continuously.

The present invention is also concerned with products 1 and 2 so obtainable.

Then product 1 is subjected to an extraction process which comprises bringing the polyol (product 1) into contact with an extracting compound which is a polyol or a polyol mixture having a number average molecular weight of at most 500 and being immiscible with the polyol (product 1), mixing the extracting compound and the polyol, allowing the extracting compound and the polyol to separate and removing the extracting compound.

This extraction process reduces the level of amines in product 1 which amines were formed during the previous alcoholizing step, in particular the level of aromatic amines like toluene diamine and diamino diphenylmethane and higher functional oligomers thereof. In addition it reduces the level of polyoxyalkylene polymeric material having allylic unsaturation at the end of the polymer chain in those cases where the flexible foam was made from polyether polyols having a higher molecular weight and comprising a higher level of unsaturation, e.g. more than 0.03 meq/g, like most presently commercial polyether polyols having a high molecular weight and an oxypropylene content of more than 30% by weight which in general have a level of unsaturation of 0.04–0.10 meq/g. The extraction process further reduces the level of compounds containing urethane and urea groups.

The reduction in unsaturation obtainable will depend inter alia upon the level of unsaturation present in the starting material, the extracting compound selected and the number of extraction steps applied. By applying the extraction process the unsaturation may be reduced by at least 10% of its original value; by applying the extraction process batchwise more than once, e.g. 5 or 6 times, or continuously the unsaturation may be reduced by 50% of its original value or more.

The extracting compounds preferably are selected from the group consisting of ethylene glycol, diethylene glycol, triethylene glycol, tetraethylene glycol, glycerol and butanediol and mixtures thereof; ethylene glycol and diethylene glycol and mixtures thereof being most preferred.

Immiscibility in the context of the present invention is defined as follows: an extracting compound is considered as immiscible if at most 30% preferably at most 20% by weight of extracting compound can be dissolved in product 1 at room temperature.

The extraction process is carried out as a conventional extraction process. It may be carried out batchwise or continuously. If the process is carried out batchwise this may be done once or preferably at least two and more preferably 2–15 times. The extraction process may be conducted at room temperature or at elevated temperature provided the temperature applied is lower than the boiling point of the extracting compound under the conditions applied and than the temperature at which the polyol (product 1) would disintegrate under the conditions applied. In general the temperature may range from ambient temperature to 240° C. but preferably is 150°–240° C. and most preferably 180°–220° C. at ambient pressure-10 bar, preferably ambient pressure −5 bar, most preferably at ambient pressure. Once the polyol (product 1) and the extracting compound have been combined they are mixed. The amount of extracting compound used may vary between wide ranges. Preferably the weight ratio of extracting compound and polyol is at least 0.1:1 and most preferably 0.25–10:1. If desired water may be present in an amount of up to 5% by weight calculated on the weight of product 1 and extracting compound. The mixing preferably is continued for a period of time of from 1 minute to 8 hours, more preferably from 5 minutes to 3 hours preferably under a $N_2$ blanket.

After the mixing is discontinued the mixture is left in order to allow the mixture to separate in two phases, then the phases are collected. Phase separation and the collection of the phases is conducted essentially in the same way as described above after the acoholysis step. The extraction process may be integrated with the acoholysis in a batchwise way or in a continuous process.

The present invention is also concerned with the polyol obtainable after this extraction process (product 3). Product 3 may be further purified, if desired, in order to remove remaining extracting compound, e.g. by evaporation which is conducted in a conventional way at a temperature below the boiling point of the high molecular weight polyol and/or by filtration. In general the evaporation conditions are as follows: temperature 120° to 200° C., preferably from 150°–180° C., time 0.25 to 10 hours, preferably 1 to 5 hours and pressure 0.1 to 100 mbar, preferably 0.1 to 10 mbar. Further extraction/evaporation steps may be conducted if desired.

After evaporation a polyol is obtained which hereinafter will be referred to as product 4. This evaporation may be integrated with the alcoholysis and the extraction process in a batchwise-way or in a continuous process. The present invention is also concerned with the polyol obtainable after this evaporation process.

Product 4 has properties which are very similar to the properties of the polyols having a high molecular weight which were originally used for making the flexible foam. In case the polyol having a high molecular weight originally used in the flexible foam was a polyether polyol having a higher level of unsaturation, the properties of product 4 are even better since the level of unsaturation is lower.

Because of these similar or even better properties product 4 is particularly useful for re-use in the preparation of flexible foams. Up to 100% of product 4 my be re-used, which means that no polyol having a high molecular weight other than product 4 is necessary for preparing a new flexible foam. The foams are made in a conventional way.

The foams are made by reacting a polyisocyanate with product 4 and optionally with freshly prepared polyol having a high molecular weight and optionally with chain extenders, cross-linkers and additives conventionally used in preparing flexible foams and using a blowing agent, preferably water, at an isocyanate index of 40–120. The foams may be made according to the one-shot, the semi-prepolymer and prepolymer process. The polyisocyanates, freshly prepared polyols, chain-extenders, cross-linkers and additives may be selected from those described hereinbefore.

The present invention is further concerned with isocyanate-terminated polyurethane (semi)-prepolymers having an NCO value of 2–30, preferably 5–20% by weight prepared by reacting an excess of polyisocyanate and a polyether polyol having an average nominal hydroxyl functionality of 2–6, a number average equivalent weight of 500–5000, an unsaturation level of less than 0.03 meq/g, preferably 0.005–0.02 meq/g, and preferably an oxypropylene content of at least 30% by weight, more preferably at least 50% by weight, most preferably at least 70% by weight. The polyols used in preparing these prepolymers can be made by extracting a polyol having a higher degree of unsaturation followed by evaporation as described hereinbefore. These polyols contain after evaporation 0.01–0.5% by weight of the extracting compound; such polyols are polyols according to the present inventions as well; the hydroxyl value of such polyols (mg KOH/g) does not differ more than 20% from the value of the polyol used in the recycled flexible foam. The polyisocyanate and polyols used may be selected from those described hereinbefore.

Although there is still some extracting compound present in the polyol and although the level of unsaturation in the polyol is lower, prepolymers made from such polyols surprisingly show only a limited viscosity increase (less than 100%, preferably less than 50%) compared with the prepolymer from which the recycled foam was made and although there is still some extracting compound present the flexible foams made from such prepolymers nevertheless show an improved compression set and although the level of unsaturation is lowered the tear strength of the foam may be improved; the other physical properties of the foam being similar (hardness, hysteresis loss, elongation, resilience); compared with the original foam.

The prepolymer is prepared conventionally, as described in e.g. EP 392788, 10850 and 22617.

Still further the present invention is concerned with a process for preparing a flexible foam by reacting the above prepolymer with water at an isocyanate index of 40–120, optionally in the presence of chain extenders, cross-linkers and additives conventionally used in preparing flexible foams.

Further the present invention is concerned with isocyanate-terminated polyurethane (semi)-prepolymers having an NCO value of 2–30% by weight prepared by reacting an excess of polyisocyanate with product 4 and with a process for preparing a flexible foam using such a (semi)-prepolymer as polyisocyanate. In case a prepolymer is used the foams are made by reacting the prepolymer with water at an isocyante index of 40–120, optionally in the presence of chain extenders, cross-linkers and additives conventionally used for preparing flexible foams. In case a semi-prepolymer is used the foams are made by reacting at an isocyanate index of 40–120 the semi-prepolymer with product 4 and/or with a freshly prepared polyol having a high molecular weight using a blowing agent, preferably water, and optionally using chain extenders, cross-linkers and additives conventionally used in preparing a flexible foam. The polyisocyanate used for preparing the (semi)-prepolymer, the freshly prepared polyol, chain-extenders, cross-linkers and additives may be selected from those mentioned hereinbefore.

Product 2 predominantly comprises lower molecular weight compounds comprising urethane, amine and/or hydroxyl groups.

Product 2 may, after alkoxylation, in particular propoxylation, and purification, in particular evaporation, be used in the preparation of polyurethane foams, in particular rigid polyurethane foams. The alkoxylation is applied in order to react away the active hydrogen containing amine groups, in particular aromatic diamines like toluene diamines and diphenylmethane diamines. Alkoxylation is conducted in a conventional way. The product obtained after alkoxylation has an hydroxyl value of 300 to 1000 mg KOH/g. After alkoxylation the product may be subjected to evaporation to give a product having an hydroxyl value of 250 and 600 mg KOH/g. The alkoxylation and purification of product 2 may also be conducted in the reverse order.

The invention is illustrated by the following examples:

EXAMPLE 1

A flexible foam was made by reacting 10 parts by weigh to prepolymer (prepared by reacting 9.6 pbw of a polymeric MDI having an isocyanate functionality of 2.7 and NCO value of 30.7% by weight and 0.4 pbw of a trifunctional polyoxyethylene polyoxypropylene polyol having 75% randomly distributed oxyethylene units and a molecular weight of 4000) and 90 pbw of a prepolymer (prepared by reacting 22.5 pbw of MDI containing 10% of 2,2'+2,4'-MDI and 67.5 pbw of a glycerol based polyoxyethylene polyoxypropylene polyol having 15% tipped oxyethylene units and a molecular weight of 6000) with a composition containing 1.96 parts by weight of water and 0.65 pbw of dimethyl imidazole.

The flexible foam so obtained was cut into pieces of about 10×10×50 cm. 56.9 kg of the foam pieces so obtained were added to 60.1 kg of stirred diethylene glycol, which was preheated at 180° C. and which contained 41.5 g of tetrabutyltitanate. The mixture was kept under a $N_2$ blanket. Then the temperature was raised to 200° C. and the mixture was distilled for 15 minutes, allowed to react for 2.5 hours and again distilled for 15 minutes. During the distillation 4.5 kg of material was distilled off. Then stirring was stopped and the mixture was allowed to phase separate while being cooled to 105° C. in 45 minutes. During 45 minutes the bottom layer (61.7 kg) was drained off, followed by 2.9 kg of interface. The upper phase was 47.9 kg. To 70 kg of upper phase so obtained 49.8 kg of diethylene glycol was added and the mixture was stirred, kept under $N_2$ and heated to 200° C. After 75 minutes stirring was stopped and the mixture was cooled to 110° C. After 75 minutes the bottom layer was drained off (75.5 kg). This extraction procedure was repeated 6 times with 39.9, 23.4, 11.6, 11.5, 21.5 and 10.7 kg of diethylene glycol. The top layer then was heated to 195° C. over a period of 85 minutes and maintained at 195° C. for 15 minutes for distillation. 28.2 kg of top-layer was obtained. 24.5 kg of this upper layer was washed three times as described above with 30, 24.7 and 19.8 kg of diethylene glycol followed by distillation at 190° C. for 3 hours and filtration. The product so obtained is a polyether polyol having an OH value of 33 mg KOH/g containing 0.4% by weight of diethylene glycol and having an unsaturation value of 0.013 meq/g. Part of this polyol is used in example 4 hereinafter and is referred to as Polyol 1.

EXAMPLE 2

Part of polyol 1 was further purified by wiped film evaporation (oil temperature 180° C., pressure less than 5 mbar, $N_2$ purge. The polyol obtained—referred to as polyol 2 and used in example 4 hereinafter—had a diethylene glycol content of between 0.01 and 0.1% by weight and an unsaturation level of 0.014 meq/g.

EXAMPLE 3

A conventional flexible foam used in car seats was glycolysed in a way similar to example 1. 5 kg of the bottom layer so obtained was propoxylated by reaction with 125 g of propylene oxide ($N_2$ blanket, 50° C., mixing) for 8 hours which was repeated 3 times. Then the product was purified by heating to 180° C. under vacuum. The product so obtained was used in Example 6.

EXAMPLE 4

An isocyanate-terminated polyurethane prepolymer was prepared by mixing 25 pbw of MDI comprising 10% of 2,2'+2,4' MDI and 75 parts of a glycerol based polyoxyethylene polyoxypropylene polyol having an oxyethylene content of 15% by weight (all tip), a molecular weight of 6000, an unsaturation value of about 0.08 meq/g, (the polyol did not contain extracting compound) at a temperature of 85° C. for 4.5 hours. The prepolymer has an NCO value of 6.7% by weight and a viscosity of 5600 mPa.s (25° C.) (Prepolymer 1).

Prepolymer 2 was prepared as prepolymer 1 with the proviso that the polyol was Polyol 1 obtained in example 1. The prepolymer has an NCO value of 6.6% by weight and a viscosity of 8000 mPa.s (25° C.).

Prepolymer 3 was prepared as prepolymer 1 with the proviso that the polyol was Polyol 2 obtained in example 2. The prepolymer had an NCO value of 6.8% by weight and a viscosity of 6600 mPa.s (25° C.). All viscosities were measured with a Brookfield viscosity measurement device.

EXAMPLE 5

Forms were made by reacting 80 pbw of prepolymer 1, 2 or 3 made in example 4 and 20 pbw of a prepolymer having an NCO value of 30% by weight, (which was made by reacting 98 pbw of polymeric MDI {NCO=30.7% by weight, isocyanate functionality=2.7} and 2 pbw of a polyol {trifunctional, molecular weight 4000, polyoxyethylene polyoxypropylene polyol with 75% by weight random oxyethylene units}), with a mixture containing 4.86 pbw of water, 0.4 pbw of dimethylimidazole and, in case of prepolymer 3, 0.7 pbw of silicone surfactant (SH 210, from Union Carbide) at index 50.

The flexible foams obtained had the following properties

|  | PREPOLYMER | | |
| --- | --- | --- | --- |
|  | 1 | 2 | 3 |
| Core density; kg/m$^3$ (Iso/DIS 845) | 26 | 26 | 28 |
| Compression hardness, 40%; N (Iso 3386/1) | 3.1 | 2.9 | 3.5 |
| Hysteresis loss; % | 43 | 42 | 41 |
| Tear Strength, max; N/m (Iso/DIS 8067) | 169 | 153 | 193 |
| Resilience; % | 43 | 45 | 44 |
| Compression set; % (Iso 1856, method A) | | | |
| Dry, 75% | 21 | 13 | 14 |
| Humid, 75% | 46 | 44 | 34 |

EXAMPLE 6

Rigid foams were made by reacting Suprasec VM 85 HF polyisocyanate obtainable from Imperial Chemical Industries PLC (Suprasec is a trademark of ICI) at an index of 220 with two polyol compositions (further details see Table 2, amounts in pbw). The physical properties of the foams are indicated in Table 2 as well.

TABLE 2

|  | Polyol composition 1 | Polyol composition 2 |
|---|---|---|
| Polyol a | 29 | — |
| Polyol b | 35 | 35 |
| Polyol c | 25 | 25 |
| Polyol d | 8 | 2.15 |
| Polyol e | — | 34.85 |
| Water | 2 | 2 |
| Tegostab B 8423, a silicone surfactant from Goldschmidt | 2 | 2 |
| trichloropropyl phosphate | 10 | 10 |
| catalyst LB from ICI | 2 | 2 |
| catalyst SFB from ICI | 9.3 | 9.3 |
| dimethyl ethanolamine | 1 | 1 |
| HCFC 141b | 21 | 26 |
| cream time, sec | 12 | 11 |
| string time, sec | 37 | 39 |
| end of rise time, sec | 105 | 115 |
| core density, kg/m$^3$ | 31 | 31 |
| Permanent Deformation under load, %, (0.04 N/2 days/70° C.) | −26 | −14 |
| Compression strength to rise, DIN 53421, kPa | 210 | 251 |
| Dimensional stability (initial, −20° C., L) DIN 53431, % | −0.1 | 0 |
| Lambda value, (ISO 2581), mW/M.K |  |  |
| initial | 22.1 | 21.0 |
| after 3 weeks at 70° C. | 29.4 | 27.5 |
| Flammability test B2 DIN 4102, cm | 10 | 12 |

Polyol a: a polyester polyol base don diethylene glycol, glycerol, adipic acid, glutaric acid and succinic acid having a functionality of 2.4 and an OH value of 347 mg KOH/g.

Polyol b: polyoxypropylene polyol having a functionality of 3.2 and an OH value of 310 mg KOH/g.

Polyol c: a polyester polyol based on diethylene glycol and adipic acid having an OH value of 112 mg KOH/g.

Polyol d: a glycerol based polyoxypropylene polyol having an OH value of 1122 mg KOH/g.

Polyol e: the polyol composition obtained in example 3.

We claim:

1. Polyols obtained by a process comprising: (a) brining a flexible polyurethane foam in contact with an alcoholizing polyol, allowing the foam and the polyol to react, then allowing the mixture to separate into an upper and lower phase, subsequently collecting these two phases in different containers and (b) subjecting the upper phase to an extraction process by bringing it into contact with an extracting compound which is a polyol or a polyol mixture having a number average molecular weight of at most 500 and being immiscible with it, mixing the extracting compound and the upper phase, allowing the mixture to separate into an upper phase and a lower phase and collecting these two phases, the extraction process being conducted 2–10 times batchwise or continuously.

2. Polyols obtained by a process according to claim 1, wherein the extracting compound which remains in the upper phase obtained during step (b) is removed.

3. A polyether polyol having an average nominal hydroxyl functionality of 2–6, a number average equivalent weight of 500–5000, an unsaturation level of less than 0.03 meq/g, comprising 0.01–0.5% by weight of the extracting compound employed in claim 1.

4. A polyether polyol according to claim 3, wherein the polyether polyol comprises at least 30% by weight of oxypropylene units.

5. An isocyanate-terminated polyurethane (semi)-prepolymer having an NCO value of 2–30% by weight, prepared by reacting an excess polyisocyanate with a polyol according to claim 2.

6. An isocyanate-terminated polyurethane (semi)-prepolymer having an NCO value of 2–30% by weight, prepared by reacting an excess of polyisocyanate with a polyol according to claim 3.

7. Process for preparing a flexible polyurethane foam using a polyol according to claim 2.

8. Process for preparing a flexible polyurethane foam using a prepolymer according to claim 5.

9. A polyol obtained by alkoxylating the lower phase obtained in the process according to claim 1, the alkoxylated polyol having hydroxyl value of 300 to 1000 mg KOH/g.

10. A polyol obtained by subjecting a polyol according to claim 9 to evaporation, the polyol after evaporation having a hydroxyl value of 250 to 600 mg KOH/g.

* * * * *